United States Patent

Kennedy, III et al.

(10) Patent No.: US 9,149,685 B2
(45) Date of Patent: Oct. 6, 2015

(54) SOFT COATING FOR A GOLF BALL

(75) Inventors: Thomas J. Kennedy, III, Wilbraham, MA (US); Hideyuki Ishii, Portland, OR (US); Yasushi Ichikawa, Tualatin, OR (US); Arthur Molinari, Beaverton, OR (US); Bradley C. Tutmark, Aloha, OR (US); Nicholas Yontz, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 607 days.

(21) Appl. No.: 13/217,062

(22) Filed: Aug. 24, 2011

(65) Prior Publication Data

US 2013/0053183 A1  Feb. 28, 2013

(51) Int. Cl.
| | |
|---|---|
| A63B 37/12 | (2006.01) |
| A63B 37/00 | (2006.01) |
| A63B 45/00 | (2006.01) |
| A63B 43/00 | (2006.01) |

(52) U.S. Cl.
CPC ......... *A63B 37/0003* (2013.01); *A63B 37/0022* (2013.01); *A63B 37/0027* (2013.01); *A63B 45/00* (2013.01); *A63B 2043/001* (2013.01)

(58) Field of Classification Search
CPC ........................ A63B 37/0022; A63B 37/0027
See application file for complete search history.

(56) References Cited

U.S. PATENT DOCUMENTS

| | | | |
|---|---|---|---|
| 4,183,836 A | | 1/1980 | Wolfe, Jr. |
| 5,409,233 A | * | 4/1995 | Kennedy ........................ 473/377 |
| 5,695,414 A | * | 12/1997 | Yokota .......................... 473/384 |
| 5,725,443 A | | 3/1998 | Sugimoto et al. |
| 5,957,785 A | | 9/1999 | Masutani et al. |
| 6,340,503 B1 | * | 1/2002 | Simonds et al. ........... 427/393.5 |
| 6,395,861 B1 | | 5/2002 | Kennedy, III |
| 6,488,596 B1 | | 12/2002 | Maruoka et al. |
| 6,761,645 B1 | | 7/2004 | Weber |
| 7,201,673 B2 | | 4/2007 | Sasaki |
| 7,250,009 B2 | | 7/2007 | Weber |
| 7,270,615 B2 | | 9/2007 | Endo et al. |
| 7,592,398 B1 | | 9/2009 | Rye et al. |
| 8,193,296 B2 | | 6/2012 | Ishii et al. |
| 8,298,619 B2 | | 10/2012 | Goodwin et al. |

(Continued)

FOREIGN PATENT DOCUMENTS

| | | |
|---|---|---|
| WO | 2012089827 A1 | 7/2012 |
| WO | 2013028626 A2 | 2/2013 |

OTHER PUBLICATIONS

BYK Additives & Instruments, BYK®-370 Surface additive solvent-borne coating systems, http://www.byk.com/en/additives/additives-by-name/byk-370.php, retrieved Aug. 19, 2011.

(Continued)

*Primary Examiner* — John E Simms, Jr.
(74) *Attorney, Agent, or Firm* — Honigman Miller Schwartz & Cohn LLP; Anna M. Budde; Jonathan P. O'Brien

(57) ABSTRACT

A golf ball having a soft outer surface coating having a hardness less than about HB on the ASTM D3363 scale, or less than about 40 on ASTM D2134 scale. The soft outer surface coating may contain polyurethane, a hydroxyl functional silicone material, or a hydroxyl functional fluoro material. Also, a method for making the golf ball. The golf ball having the soft outer surface coating exhibits a high spin rate over short shots essentially without degrading performance on driver shots, as compared with the performance of the uncoated golf ball.

6 Claims, 3 Drawing Sheets

(56) References Cited

U.S. PATENT DOCUMENTS

| | | | |
|---|---|---|---|
| 8,415,421 B2* | 4/2013 | Tarao et al. | 524/507 |
| 2002/0098290 A1* | 7/2002 | Simonds et al. | 427/385.5 |
| 2003/0050425 A1* | 3/2003 | Kennedy et al. | 528/55 |
| 2003/0083158 A1* | 5/2003 | Ishino | 473/378 |
| 2004/0254032 A1* | 12/2004 | Lutz et al. | 473/378 |
| 2005/0038190 A1* | 2/2005 | Kuntimaddi | 525/123 |
| 2005/0261085 A1* | 11/2005 | Sasaki | 473/371 |
| 2006/0009607 A1 | 1/2006 | Lutz et al. | |
| 2006/0089419 A1 | 4/2006 | Hogge et al. | |
| 2008/0015055 A1* | 1/2008 | Lutz et al. | 473/378 |
| 2008/0064530 A1* | 3/2008 | Matroni et al. | 473/378 |
| 2008/0280699 A1* | 11/2008 | Jarvholm | 473/378 |
| 2009/0062037 A1 | 3/2009 | Ohama et al. | |
| 2010/0075776 A1 | 3/2010 | Nardacci et al. | |
| 2011/0033712 A1 | 2/2011 | Xie et al. | |
| 2011/0224024 A1 | 9/2011 | Tutmark | |
| 2011/0244989 A1 | 10/2011 | Tarao et al. | |
| 2012/0089827 A1 | 4/2012 | Reynolds et al. | |
| 2012/0238379 A1 | 9/2012 | Sullivan et al. | |
| 2013/0045820 A1 | 2/2013 | Sullivan et al. | |
| 2013/0053183 A1 | 2/2013 | Kennedy, III et al. | |

OTHER PUBLICATIONS

BYK Additives & Instruments, Data Sheet S204 Issue Mar. 2010, Reactive Silicone Surface Additives, http://www.byk.com/additives.

Bayer Material Science, Desmophen® Product Data Sheet, Desmophen® 1652, Edition Jun. 1, 2011.

Linear Polycarbonate Polyesters with Desmophen® 1652A, p. 22.

Perstorp Winning Formulas, Tolonate® HDB-LV—Low Viscosity, Product Data Sheet, Sep. 2008 Ref. B02, Version 5, www.perstorpcoatings.com.

International Search Report and Written Opinion in PCT Application No. PCT/US2012/051597, mailed on Feb. 27, 2013.

Notification of First Office Action in Chinese Utility Model Patent Application No. 201220425728.5, issued on Jan. 7, 2013.

International Search Report and Written Opinion for PCT Application No. PCT/US2014/014569 mailed on Dec. 4, 2014; 11 pages.

* cited by examiner

SOFT COATING FOR A GOLF BALL

BACKGROUND

The present invention relates generally to a golf ball having a soft coating. In particular, the invention relates to a golf ball having a soft surface coating, or outer surface coating, that maintains durability and has a low energy surface.

Golf balls are important sporting goods that have changed with changes in technology. For example, balls were first made of wood, and then by stuffing boiled, softened feathers into a leather sack. The sack typically was painted white, and would tighten upon drying. However, because the feather ball tended to absorb moisture and to split, many balls were required to play a round. Also, these feather balls were expensive as compared with wooden balls.

Both feather and wooden balls were in use until the gutta percha ball was made. The gutta percha ball was relatively inexpensive and easily manufactured. Also, the gutta percha ball was fairly durable, as compared with the feather ball, performed well because the surface could easily be roughened to improve flight characteristics, and so became popular. However, the ball exhibited a tendency to break up in flight.

Golf balls comprising other elastic materials then were developed. For example, a golf ball having a rubber core and an elastic thread wound tightly around the core was developed. The winding was covered with gutta percha at first, but later with balata. However, balata-covered golf balls often are damaged by players who are less skilled at striking the ball. Thus, tougher covers were developed, including in particular covers comprising an ionomer compound (Surlyn® is the trade name for one type of ionomer) or a polyurethane compound.

The surface of one type of modern golf ball typically is hard and durable. This type of golf ball is generally two-piece with a hard cover and a rubber core. In particular, covers comprising an ionomer compound are hard. Other types of golf balls are multilayered with a relatively soft (lower hardness, i.e., less than 65 Shore D) cover and a relatively hard mantle layer. Modern golf balls also often are coated with an abrasion-resistant relatively hard polyurethane surface coating. Such a hard coating typically adds a glossy appearance and durability to the ball. Often, the hardness rating of such material is approximately equivalent to the hardness of a 3H pencil and is greater than 40 on the Sword Rocker hardness scale.

Hard-covered golf balls offer low spin, durability, and other desirable golf ball properties and characteristics. However, hard-covered golf balls are not preferred by skilled players who seek to maintain control and achieve maximum distance on selected shots. Typically, golf balls that are intended to achieve maximum distance on a shot, such as a tee shot or a driver shot, are designed to spin less off the tee. Often, such golf balls preferred by a highly skilled golfer have a multilayer construction with a low hardness cover (less than 65 Shore D) and a higher hardness mantle layer. This construction allows for low spin off the tee but higher spin on shorter iron and wedge shots. The higher spin on short irons and wedge shots allows for better control of the golf ball upon landing. Such landing control is imparted by high spin rate and the ability to control that spin. It is difficult to control the spin of a hard-covered golf ball due to the nature of a hard cover/golf club face interaction (at least in part because a hard cover tends to slip up a club face).

Modern soft golf balls provide spin control and are resistant to abrasion, to cuts when the golf ball is not struck squarely, and to degradation with continuing play. Golf balls having too soft a surface, however, exhibit a tendency to collect dirt and to be difficult to remove from storage, such as the player's pocket.

Therefore, there exists a need in the art for a high-end golf ball that provides high spin rate and the ability to control that spin essentially without degrading drive performance, yet remains durable. There also exists a need for such a ball that has a surface that does not tend to collect dirt.

SUMMARY

In one aspect, the invention provides a golf ball having a soft outer surface coating. In particular, an aspect of the invention provides a golf ball having a polyurethane soft outer surface coating having a hardness less than about HB on the ASTM D3363 scale.

In another aspect, the invention provides a golf ball having a soft outer surface coating, particularly a polyurethane soft outer surface coating, having a hardness of less than about 40 on ASTM D2134, which also is known as the Sward Rocker Hardness test.

In another aspect, the invention provides a method for making a golf ball having an outer surface layer comprising coating the outer surface layer with a soft outer surface coating having a hardness less than about HB on the ASTM D3363 scale.

In still another aspect, the invention provides a method for making a golf ball having an outer surface layer comprising coating the outer surface layer with a soft outer surface coating having a hardness of less than about 40 on ASTM D2134 scale.

In yet another aspect, the invention provides a golf ball comprising a soft surface coating, wherein the golf ball exhibits a high spin rate over short shots essentially without degrading performance on driver shots, as compared with the performance of the uncoated ball or of a golf ball with a harder surface coating.

Another aspect of the invention provides for a low energy surface on the soft outer surface coating.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
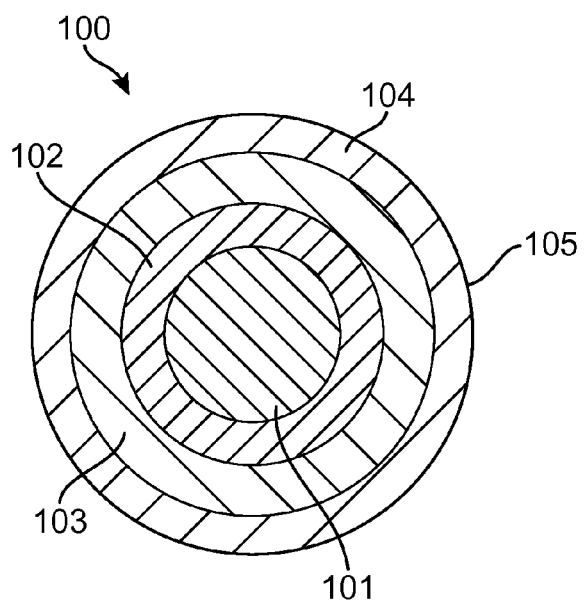
FIG. 1 is a schematic drawing of a multi-layer golf ball having a soft outer surface coating in accordance with an embodiment of the invention.

In general, the invention relates to a golf ball having a soft surface coating, also called a soft outer surface coating. In one embodiment, the invention provides a golf ball having a soft outer surface coating, particularly a polyurethane soft outer surface coating, having a hardness less than about HB on the ASTM D3363 scale.

In another aspect, the invention provides a golf ball having a soft surface coating, particularly a polyurethane soft outer surface coating, having a hardness of less than about 40 on ASTM D2134 scale, which also is known as the Sward Rocker Hardness test.

In another aspect, the invention provides a method for making a golf ball having an outer surface layer comprising coating the outer surface layer with a soft outer surface coating having a hardness less than about HB on the ASTM D3363 scale.

In still another aspect, the invention provides a method for making a golf ball having an outer surface layer comprising coating the outer surface layer with a soft outer surface coating having a hardness of less than about 40 on ASTM D2134 scale.

In yet another aspect, the invention provides a golf ball comprising a soft surface coating, wherein the golf ball exhibits a high spin rate over short shots essentially without degrading performance on driver shots, as compared with the performance of the uncoated ball or of a golf ball having a harder surface coating.

In still another aspect, the invention provides a golf ball having a low energy soft outer surface coating so that the soft outer surface coating does not collect dirt and may be handled in a typical manner.

The inventors have discovered that a soft surface coating provides a golf ball exhibiting a high spin rate, and thus good control, over short shots, essentially without degrading performance on driver shots as compared with the performance of the uncoated ball or a golf ball with a harder outer coating. The soft surface coating thus transforms a golf ball that has a hard, durable surface that drives well but is less responsive to impartation of spin in short iron shots into a golf ball that essentially maintains driver shot properties and characteristics and greatly increases spin rate and, therefore, control on short iron shots. Although the inventors do not wish to be bound by theory, it is believed that the soft surface coating enables the short iron club faces to remain in contact with the golf ball longer while imparting spin, whereas, on driver shots, any increased contact time does not impart spin in view of the nature of the club face/golf ball contact. Therefore, driver shot properties and characteristics are essentially maintained. As used herein, 'drivers' are considered to be clubs having a loft of less than about 40°, and "short irons" are clubs having a loft greater than about 40°. Thus, all woods are considered 'drivers,' as are most of the irons.

The soft outer surface coating also improves spin rate (and thus control) of a relatively soft cover, multilayer golf ball by replacing the typical hard surface coating. The replacement allows for improved spin on short wedge shots into the green.

In embodiments, the soft outer surface coating comprises polyurethane. The inventors also have discovered that the soft surface coating can be modified to form a low energy surface so as not to at least reduce dirt collection by incorporating a hydroxyl or amine functionalized polydimethylsiloxane (PDS) or fluoropolymer. The added PDS or fluoropolymer, together with the polyurethane soft outer surface coating, forms a low energy surface that at least decreases dirt collection and does not collect dirt and makes ball handling, such as the player's putting a golf ball into a pocket and removing the golf ball therefrom, easier. The skilled practitioner recognizes that soft surfaces such as the soft outer surface coating of embodiments herein are high energy surfaces, and it is counter-intuitive to provide a low energy surface as herein described. However, the inventors have discovered that imparting a lower energy surface to the soft outer surface coating allows for a golf ball to shed dirt and improves handling while maintaining the soft nature and performance properties and characteristics of the soft outer surface coating, especially the increased spin when the golf ball is struck by a golf club on a short shot.

Golf balls suitably coated with embodiments of the soft surface coating can be made from any material in any arrangement of layers that forms a suitable golf ball. As the skilled practitioner recognizes, many compositions of matter are used to advantage in forming golf balls and imparting them with properties and characteristics sought by the designer or the user. Compositions often used in manufacture of golf balls and layers of golf balls include, but are not limited to, liquids, typically dense, viscous, or both; rubbers, both natural and synthetic; and both thermoplastic and thermoset polymers, such as polyurethane and ionomers. Often, each layer of a golf ball is made from a different type of composition. In particular, inner cores often comprise rubber, thermoplastic or thermoset material, or ionomer material. These compositions can be blended with other compositions, and with fillers, additives, and the like. A hard, durable composition may be selected for the outer cover. A soft, durable composition, such as a polyurethane, also may be selected for the outer cover. Golf balls comprising any of these materials in any arrangement of layers are suitably covered by embodiments of the soft surface coating disclosed and claimed herein.

Golf balls of embodiments herein can be 'conforming' or 'non-conforming' golf balls. That is, golf balls having the soft surface coating described herein may conform to the rules regarding, for example, weight, diameter, physical design, and performance properties and characteristics, of one or more of various governing entities, such as the United States Golf Association (USGA). Such balls typically are required for professional tournament play. However, non-conforming balls for casual use, for training, and for other uses, also are contemplated herein.

For convenience, the subject matter of the invention will be described in detail as it relates to a four-piece ball. A four-piece ball has 4 distinct layers, with each successive layer essentially completely surrounding the previous layer. However, the skilled practitioner recognizes that the soft surface coating described and claimed herein can be applied to any golf ball, or indeed any other object for which a soft surface coating is suitable. Thus, a one-piece ball, a two-piece ball, and a three-piece ball can be suitable covered with the soft surface layer in embodiments of the invention. Similarly, the soft surface layer also can be applied to a five-piece ball, a six-piece ball, or any golf ball having any number of layers.

FIG. 1 illustrates a median cross-section of a four-piece golf ball having a soft surface coating on the outer surface of a golf ball. Golf ball 100 comprises center or inner core layer 101, outer core layer 102 essentially completely surrounding, enveloping, or encompassing inner core layer 101, inner cover layer 103 essentially completely surrounding, enveloping, or encompassing outer core layer 102, outer cover layer 104 essentially completely surrounding, enveloping, or encompassing inner cover layer 103, and soft surface coating 105 surrounding, enveloping, or encompassing outer cover layer 104.

Embodiments of the invention are directed to a soft surface coating comprising polyurethane, i.e., is a soft polyurethane coating on the outside of the outermost cover layer. The skilled practitioner recognizes that urethane typically is formed by reaction of an isocyanate moiety with a hydroxyl moiety to form a urethane moiety. To form a polymer, reactants typically have at least two functional moieties on each molecule to ensure that each molecule can react with two other molecules. Similarly, an amine moiety reacts with the isocyanate moiety to form a urea moiety. Thus, amine-containing and hydroxyl-containing compounds can be reacted with the isocyanate-containing compound to form a polymeric material. A preponderance of hydroxyl-containing compounds yields a polyurethane. Other reactants, such as chain extenders, and catalysts also may be present. The urethane-forming reactions and the alternative and chain extending reactants are well-known to the skilled practitioner. With the guidance provided herein, the skilled practitioner will be able to form a satisfactory polyurethane coating.

Embodiments of the invention are directed to golf balls having a soft outer surface coating comprising a polyurethane/polyurea coating resulting from reaction of the isocyanate moieties with both hydroxyl-containing reactants and amine-containing reactants to form the coating.

Other embodiments are directed to golf balls having a soft outer surface coating comprising the polyurea reaction product of isocyanate and amine moieties.

Thus, embodiments are directed to a soft surface coating comprising a composition selected from the group consisting of polyurethane, polyurea, and blends thereof.

The outer cover layer of a golf ball often is a coating that can be applied in a typical coating operation. A coating operation typically involves application of a liquid comprising solvent and coating by brushing, spraying, or by any suitable application method. The solvent then evaporates and the coating is formed on the surface. The golf ball may be heated to increase the rate at which solvent evaporates. Typically, temperatures are increased to about 150° F. to about 200° F. for a time sufficient to evaporate the solvent and form the coating. Any coating operation is suitable for application of the outer cover layer.

Similarly, in an embodiment, a golf ball having an outer cover layer further comprises a polyurethane soft surface coating formed in a coating operation. In embodiments, a coating is formed by reaction of a polyol that typically has a hydroxyl equivalent weight greater than about 500 with an isocyanate that typically has an NCO equivalent weight of greater than about 100. The skilled practitioner recognizes that the 'equivalent weight' as used herein is the molecular weight of a moiety-containing compound per unit moiety. Therefore, as used here, a polyol typically has a molecular weight of greater than about 500 per hydroxyl moiety, and the isocyanate has a molecular weight of greater than about 100 per NCO moiety.

In an embodiment, the polyurethane soft outer surface coating is formed by combination of two components. A first component comprises polyol reactants and solvents, and a second component comprises isocyanate compound. Either component also can contain catalyst, solvents, and other reactants and additives.

The polyol reactants typically have a hydroxyl equivalent weight of at least about 500. Polyol reactants have at least two hydroxyl, typically terminal hydroxyl, moieties. Examples of polyol reactants include polyether polyols having a hydroxyl equivalent weight of at least about 500, such as polyoxyethylene glycol (PEG 1000 or greater), polyoxypropylene glycol (PPG 1000 or greater) and polyoxytetramethylene glycol (PTMG); polyester polyols; lactone based polyester polyols; polycarbonate polyols; and acrylic polyols. Two or more kinds of the polyols may be used in combination.

In more typical embodiments, linear polyols are used. In particular embodiments, linear polyester polyols having a hydroxyl equivalent weight of at least about 500, are used. A particular suitable polyol is Desmophen® 1652, a linear polyester polyol having an equivalent weight of about 1060. Whereas Desmophen® 1652 is solvent-free, polyols in solvents also are suitably used. For example Desmophen® 670A-80 is a polyester having a hydroxyl equivalent weight of 500, is made available as a high-solids (about 80 percent) solution in butyl acetate solvent. Desmophen® products are available from Bayer. With the guidance provided herein, the skilled practitioner will be able to identify suitable polyol reactants.

The isocyanate reactants typically have an NCO equivalent weight of at least about 100. Isocyanate reactants have at least two NCO moieties. Examples of suitable isocyanate reactants include aliphatic di-isocyanates and biurets, trimmers, aromatic polyisocyanates, and naphthenic or alicyclic polyisocyanates. Two or more kinds of the diisocyanate may be used in combination. An example of naphthenic or alicyclic diisocyanate is isophorone diisocyanate (IPDI). An illustrative example of the aromatic diisocyanate is diphenylmethane diisocyanate (MDI). Typically, a linear aliphatic di-isocyanate is used. An illustrative example of aliphatic diisocyanate is hexamethylene diisocyanate (HDI). In particular, a low viscosity solvent-free aliphatic polyisocyanate having an NCO equivalent weight of about 179 is available solvent free as Tolonate® HDB-LV from Perstorp Coatings. This product is based on HDI biuret. With the guidance provided herein, the skilled practitioner will be able to identify suitable isocyanate reactants.

Catalyst may be used to accelerate the reaction rate. Suitable catalysts include, but are not limited to, bismuth catalyst; zinc octoate; stannous octoate; tin catalysts such as di-butyltin dilaurate (DABCO® T-12 manufactured by Air Products and Chemicals, Inc.), di-butyltin diacetate (DABCO® T-1); stannous octoate (DABCO® T-9); tin (II) chloride, tin (IV) chloride, di-butyltin dimethoxide (FASCAT®-4211), dimethyl-bis[1-oxonedecyl)oxy]stannane (FORMEZ® UL-28), di-n-octyltin bis-isooctyl mercaptoacetate (FORMEZ® UL-29); and amine catalysts such as triethylenediamine (DABCO® 33-LV), triethylamine, and tributylamine; and mixtures thereof. The skilled practitioner recognizes that the various catalysts provide different reaction rates or require different conditions, typically activation temperature at which the catalyst is active. With the guidance provided herein, the skilled practitioner will be able to identify and select a suitable catalyst.

In one embodiment, the catalyst is di-butyltin dilaurate. The catalyst typically is added in an amount sufficient to catalyze the reaction of the components in the reactive mixture. In one embodiment, the catalyst is present in an amount from about 0.001 percent to about 5 percent by weight of the composition. For example, when using a tin catalyst such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalyst to unconventionally high levels enables a reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

In embodiments, the coating is formed by combination of two component streams, a stream comprising hydroxyl moieties and a stream comprising isocyanate moieties. Typically, a first stream comprises a mixture of compounds containing hydroxyl-containing compounds, solvents for the hydroxyl-containing compounds and for the resultant coating, and catalyst are included in this component mixture. Other reactants and additives, such as other compounds having hydroxyl or amine functionality, also can be included in this component mixture. Typically, a second component stream comprises the isocyanate-containing compound. Other reactants, solvents, and additives also can be included in this component stream.

Figure 2:
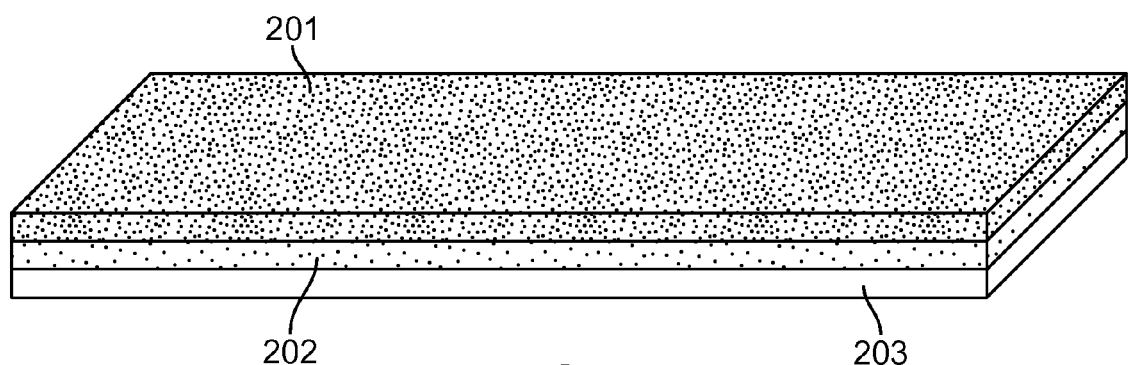
FIG. 2 is a schematic drawing illustrating an outer surface coating on a primer layer on the surface of the outer cover of a golf ball.

In embodiments, the streams are mixed and applied to a golf ball. The coating may be applied directly to the outer surface of the golf ball. In some embodiments, a primer may be used to improve adhesion between the coating and the golf ball. As shown schematically in FIG. 2, primer layer 202 is between golf ball surface 203 and outer surface coating 105. Any primer that prepares the surface of the golf ball for application of the polyurethane soft outer surface coating is suitable. The skilled practitioner recognizes that the type of primer relates to the chemical composition of the outer cover layer of the golf ball. For example, a polyurethane cover can usefully be primed with a polyurethane dispersion. Suitable polyurethane dispersions are based on polyester polyol and isocyanate dispersions in water, such as Bayhydrol® 110, which is an anionic dispersion of an aliphatic polyester urethane resin in water/n-methyl-2-pyrrolidone. Similarly, an ionomeric cover layer can be primed with a similar polyurethane dispersion. With the guidance provided herein, the skilled practitioner will be able to identify and select appropriate optional primers.

Typically, the soft surface coating is a thin coating, i.e., between about 4 microns and about 50 microns. More typically, the coating thickness is between about 10 microns and about 30 microns. A thin coating provides a surface that imparts the properties and characteristics sought and is durable. A thicker coating will tend to degrade the flight of the golf ball. Although the inventors do not wish to be bound by theory, it is believed that a thicker coating will decrease the efficiency of the dimple pattern.

Embodiments of the resulting coating provide a low-hardness, or soft, surface. Therefore, the ball has improved spin control on short shots, such as shots around the green. High-loft clubs, such as wedges and high irons, can impart spin to a thus-coated golf ball in view of the soft surface thereof. However, low-loft clubs, such as drivers and low irons, will not impart as much spin. Although the inventors do not wish to be bound by theory, it is believed that the different natures of the golf ball/club interactions between low-loft clubs and high-loft clubs contributes significantly to this difference in spin. Therefore, drive performance, particularly as evaluated by the distance the golf ball travels upon being struck with a low-loft club, remains essentially unaffected because spin rate is essentially the same as that of an uncoated golf ball or a golf ball with a conventional harder outer coating, but spin rate and control with high-loft clubs is greatly improved.

The hardness of the soft surface coating can be determined or measured by any means known for such measurements of coatings of this type. Two hardness tests, ASTM D3363 and ASTM D2134, are conveniently used to determine the hardness of the coating herein.

ASTM D3363 is a test method for determining film hardness by pencil. This test method covers a procedure for rapid, inexpensive determination of the film hardness of an organic coating on a substrate in terms of drawing leads or pencil leads of known hardness. Pencil hardness measurements have been used by the coatings industry for many years to determine the hardness of clear and pigmented organic coating films. This test method has also been used to determine the cure of these coatings, especially when force-dried using heat.

Figure 3:
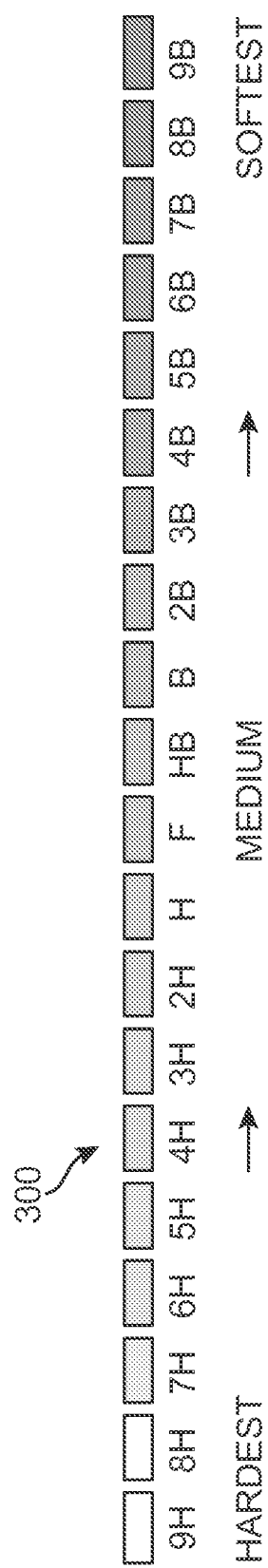
FIG. 3 is an illustration of the pencil hardness scale.

FIG. 3 illustrates the pencil hardness scale 300 described in ASTM D3363. Embodiments of the invention typically yield coatings that have a pencil hardness of HB on scale 300. Harder coatings tend not to yield the properties and characteristics sought. More typically, embodiments have a pencil hardness of B, and even more typically, 2B. For comparison, many coatings for golf balls have a pencil hardness rating in excess of 3H.

Another suitable method for determining the hardness of the soft surface coating is a test method for determining the hardness of organic coating with a Sward-type rocker. This determination method is described in ASTM D2134. This test method covers the determination of the relative degree of surface hardness of organic coatings using a specific apparatus widely used in the coatings industry. Sward-type hardness rocker instruments have been used by the coatings industry for more than a half a century as a nondestructive test instrument to measure cure and ultimate surface hardness of organic coatings.

Sward Rocker Hardness testing machines are well-known to the skilled practitioner. The tester is used for the determination of the hardness of organic coatings and relies on the principle that the amplitude of oscillation of a rocking device decreases more rapidly on a softer surface. Typically, the results obtained from the test piece as a percentage of the number of rocks made on a plate glass standard representing 100 percent.

Embodiments of the soft surface coating herein typically have a Sward Rocker Hardness test value less than about 40, more typically less than about 35. Harder coatings tend not to yield the properties and characteristics sought. For comparison, many coatings for golf balls have a Sward Rocker Hardness of at least 40, more typically at least 45.

Golf balls having embodiments of a polyurethane soft surface coating thereon have high surface energy and a high co-efficient of friction. Other high-energy surface coatings also may provide the benefits of a soft outer surface coating. Such coatings have properties and characteristics similar to those of the polyurethane soft outer surface coating described herein, but may have a different composition. Such coatings often come in a form suitable for application to the surface of a golf ball by spraying.

Embodiments of the invention are directed to a soft surface coating that has a low surface energy. Whereas it would seem to be contradictory to reduce the surface energy of a coating intended to enhance spin rate on high-loft shots, the inventors have discovered that the face of high-loft clubs, which typically have a loft greater than about 45°, contact the surface of the golf ball with sufficient energy that the low surface energy has little effect on spin.

Thus, embodiments incorporate a 'low energy' composition into the soft surface coating to reduce the surface energy of the coating. The low energy composition lowers the coefficient of friction. Embodiments of the invention having low surface energy will have not only low hardness but also low surface energy and a low co-efficient of friction. Lowering the coefficient of friction makes handling during production easier by reducing the tendency of golf balls to stick together in chutes, tubes, and other equipment. A lower coefficient of friction increases ease of handling the golf balls by the player, such as putting the golf ball into a pocket and then retrieving the golf ball. Also, a low energy surface also tends to decrease the tendency of dirt to stick to the ball.

Low energy compositions include functionalized silicone and siloxane polymers and fluoro-polymer compounds. Silicone and siloxane polymers include, but are not limited to, polydimethylsiloxane, polymethylphenylsiloxane, polyethylphenylsiloxane, polymethyl cyclo-hexylsiloxane, polymethylbutylsiloxane, polymethyl-ethylsiloxane, polybutylphenylsiloxane, polydiphenyl-siloxane, polymethylhexylsiloxane, and carbonyl terminated siloxanes. Polydimethylsiloxane (PDS) typically is used. An exemplary fluoro-polymer compound is polytetrafluoroethylene (PTFE).

A low energy composition typically is functionalized to be able to incorporate the composition into the polyurethane soft surface coating if the composition is not able to react with the polyurethane-forming reactants. Functionalization typically affords the opportunity for the functionalized composition to react with the polyurethane-forming reactants and to become a part of the polyurethane polymer structure. This reaction will reduce the tendency of the low energy composition to separate from the coating.

Thus, low energy compositions are functionalized to react with the polyurethane reactants to form a coating. Typically, functionalizing moieties thus are hydroxyl or amine moieties, both of which react with the NCO moieties of the isocyanate. The skilled practitioner recognizes that a hydroxyl moiety might be incorporated onto a silicone or siloxane by reaction with a polyester polyol. With the guidance provided herein, the skilled practitioner will be able to identify and select suitable functionalizing compounds.

Figure 4:
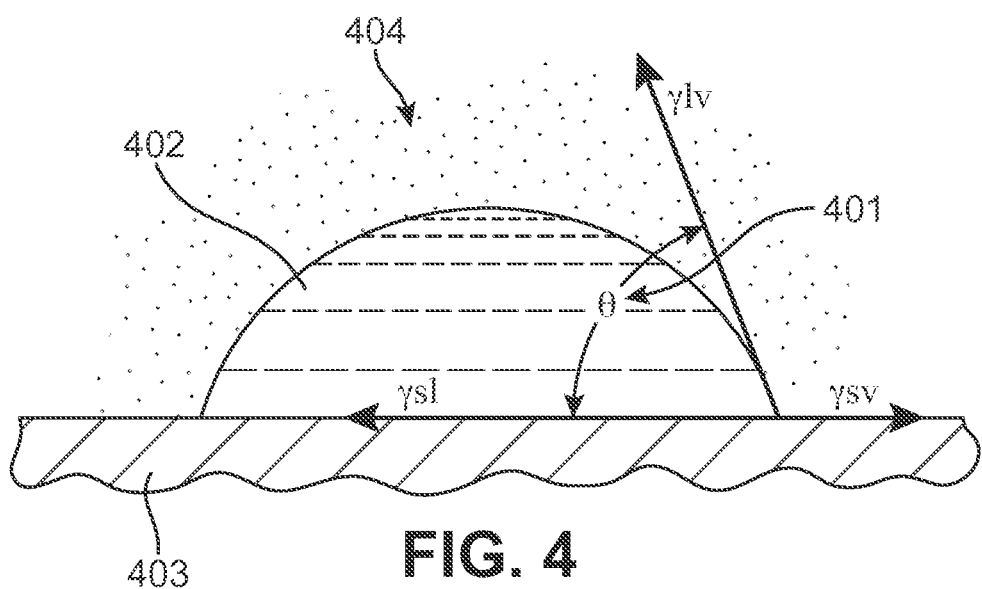
FIG. 4 is a schematic illustration of the application of Young's Equation to a liquid drop on a surface of a solid.

Surface energy is reflected in the contact angle θ, the angle at which a liquid/vapor interface meets the solid/liquid interface. This angle 401 is illustrated in FIG. 4, which is a graphical illustration of Young's equation. As can be seen in FIG. 4, a drop of liquid 402 is placed on solid 403 in the presence of vapor 404. As can be seen in FIG. 4, a drop of liquid 402 on a solid surface 403 forms a truncated sphere, the surface of which forms an angle θ with the solid. For a given liquid, the greater the surface energy of solid 403, the smaller θ will be.

Young's equation relates the surface tensions among the three (solid, liquid, and gas) phases. Young's equation is as follows:

$$\gamma^{sv} = \gamma^{sl} + \gamma^{lv} \cos\theta$$

where θ is the angle at which the liquid/vapor interface meets the solid/liquid interface;

$\gamma^{sv}$ is the solid/vapor surface tension;
$\gamma^{sl}$ is the solid/liquid surface tension; and
$\gamma^{lv}$ is the liquid/vapor surface tension.

The contact angle (θ) typically is measured using a goniometer, which provides a means for measuring the contact angle of a liquid on a surface. The liquid utilized typically is deionized water. Embodiments of the polyurethane soft surface coating typically have a surface energy of less than about 40 dynes/cm when a low energy composition is present in the soft surface coating comprising hydroxyl-functionalized silicone of embodiments herein.

EXAMPLES

The following examples illustrate, but do not limit, the subject matter of the invention, which is limited only by the appended claims.

Example 1

Component A comprising polyol compounds, solvent, and catalyst, and Component B comprising isocyanate, are mixed and are applied to the surface of a golf ball in accordance with a typical coating operation, as follows:

| | Parts by weight |
|---|---|
| Component A (Polyol) | |
| Bayer Desmophen ® 1652 | 100 |
| Bayer Desmophen ® 670A-80 | 50 |
| Methyl iso-butyl ketone | 117.5 |
| n-Butyl acetate | 117.5 |
| Toluene | 117.5 |
| DABCO ® T-12 (10 percent solution) | 0.4 |
| Component B (Isocyanate) | |
| Tolonate HDB-LV | 43.5 |

Component A is mixed with component B, and the mixture then is applied through a typical coating operation onto the surface of a golf ball. The coating is allowed to cure and the solvent is allowed to evaporate for 30 minutes at 150° F. The golf ball is allowed to cool and then is packaged.

The golf ball of Example 1 has a soft high-energy surface that affords the opportunity to impart spin to the golf ball when the golf ball is struck with a high-loft club essentially without deleteriously affecting driver shot properties and characteristics.

The coating on the golf ball has a surface hardness less than HB on the pencil hardness test and less than about 40 on the Sward Rocker Hardness test.

Example 2

Component A comprising polyol compounds, solvent, and catalyst, and Component B comprising isocyanate, are mixed and are applied to the surface of a golf ball in accordance with a typical coating operation, as follows:

| | Parts by weight |
|---|---|
| Component A (Polyol) | |
| Bayer Desmophen ® 1652 | 100 |
| Bayer Desmophen ® 670A-80 | 50 |
| Methyl iso-butyl ketone | 117.5 |
| n-Butyl acetate | 117.5 |
| Toluene | 117.5 |
| DABCO ® T-12 (10 percent solution) | 0.4 |
| BYK-370 | 1 |
| Component B (Isocyanate) | |
| Tolonate HDB-LV | 43.5 |

Component A is mixed with component B, and the mixture then is applied through a typical coating operation onto the surface of a golf ball. The coating is allowed to cure and the solvent is allowed to evaporate for 30 minutes at 150° F. The golf ball is allowed to cool and then is packaged.

The golf ball of Example 2 has a soft low-energy surface that affords the opportunity to impart spin to the golf ball when the golf ball is struck without attracting dirt, disrupting manufacturing by tending to clump together, and without reducing the impartation of spin when struck with a high-loft club. Also, the golf ball performs well when struck with a low-loft club, essentially without deleterious effect to driver shot properties and characteristics.

The coating on the golf ball has a surface hardness less than HB on the pencil hardness test and less than about 40 on the Sward Rocker Hardness test. The coating on the golf ball also has a surface energy less than about 40 dynes/cm.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising an outer surface coating incorporating a low surface energy composition and having a hardness either (a) 2B on the ASTM D3363 scale or (b) less than about 35 on ASTM D2134 scale, wherein the outer surface coating has a surface energy less than about 40 dynes/cm.

2. The golf ball of claim 1, wherein the soft outer surface coating comprises polyurea.

3. The golf ball of claim 1, wherein the low energy composition comprises a member selected from the group consisting of hydroxyl-functional fluoropolymer, amine-functional fluoropolymer, hydroxyl-functional silicone, amine-functional silicone, and combinations thereof.

4. A golf ball comprising an outer surface coating incorporating a low surface energy composition to provide the outer surface coating with a surface energy less than about 40 dynes/cm and having a hardness either (a) 2B on the ASTM D3363 scale or (b) less than about 35 on ASTM D2134 scale, and wherein the golf ball exhibits a high spin rate over short shots essentially without degrading performance on driver shots, as compared with the performance of the uncoated golf ball.

5. The golf ball of claim 4, wherein the soft outer surface coating comprises polyurea.

6. The golf ball of claim 4, wherein the low energy composition comprises a member selected from the group consisting of hydroxyl-functional silicone, amine-functional silicone, hydroxyl-functional fluoropolymer, amine-functional fluoropolymer, and combinations thereof.

* * * * *